United States Patent [19]
Shinosaki et al.

[11] Patent Number: 5,921,371
[45] Date of Patent: Jul. 13, 1999

[54] SLAB TRANSPORT TIRE ROLLER AND METHOD OF PRODUCING SAME

[75] Inventors: Akira Shinosaki; Yasuhiko Horibe, both of Hirakata, Japan

[73] Assignee: Kubota Corporation, Osaka, Japan

[21] Appl. No.: 08/847,469

[22] Filed: Apr. 25, 1997

[30] Foreign Application Priority Data

Feb. 5, 1997 [JP] Japan ................................. 9-022493

[51] Int. Cl.$^6$ .................................................. B65G 13/00
[52] U.S. Cl. ............................................................. 193/37
[58] Field of Search ................................ 193/35 R, 37; 198/952

[56] References Cited

U.S. PATENT DOCUMENTS

| 2,024,024 | 12/1935 | Carpenter | 193/37 X |
| 2,025,547 | 12/1935 | Ornitz | 193/37 X |

FOREIGN PATENT DOCUMENTS

| 782011 | 11/1934 | France . | |
| 3740620 | 6/1988 | Germany | 193/37 |
| 4-354716 | 12/1992 | Japan | 193/37 |
| 8200216 | 8/1982 | Netherlands | 193/37 |
| 40 41 217 | 7/1991 | Netherlands . | |
| 305900 | 2/1929 | United Kingdom . | |
| WO 94/21978 | 9/1994 | WIPO . | |

*Primary Examiner*—James R. Bidwell
*Attorney, Agent, or Firm*—Armstrong, Westerman, Hattori, McLeland & Naughton

[57] ABSTRACT

The invention provides a slab transport tire roller which is easy to assemble and wherein a heat-insulating material is protected to render the roller reliably operable over a prolonged period of time. The tire roller comprises tires fixedly arranged respectively on outer peripheral portions of a pipe for passing cooling water therethrough, and a tubular protective sleeve fitted around the pipe between the tires with the heat-insulating material accommodated in the sleeve. The protective sleeve is engaged with the pipe or with at least one of the tires adjacent to the sleeve rotatably therewith. The protective sleeve can be composed of a tubular sleeve member and side plates attached to respective open ends of the sleeve member.

10 Claims, 6 Drawing Sheets

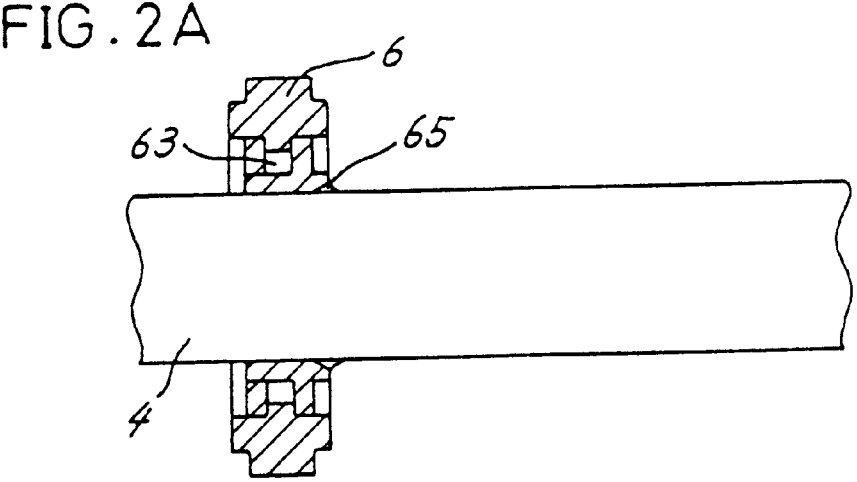
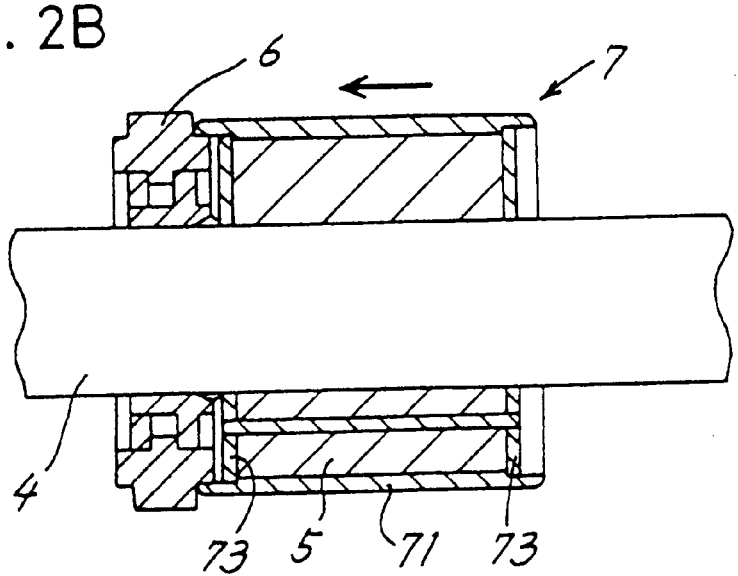
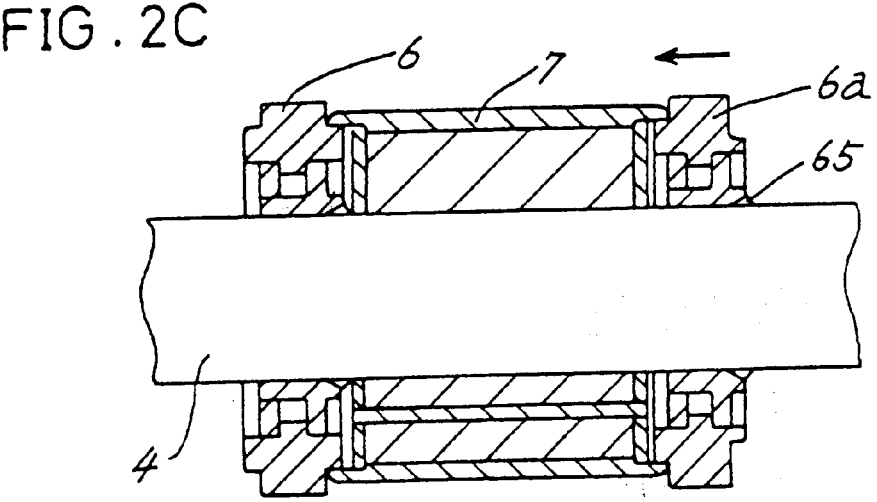

_5,921,371_

SLAB TRANSPORT TIRE ROLLER AND METHOD OF PRODUCING SAME

FIELD OF THE INVENTION

The present invention relates to tire rollers for transporting thin slabs for use in thin slab continuous casting lines and to a method of producing the same.

BACKGROUND OF THE INVENTION

The thin slab continuous casting lines of iron mills have a heating furnace of the tunnel type disposed between casting equipment and rolling equipment. The heating furnace has inside thereof a large number of tire rollers arranged longitudinally thereof for transporting slabs as cast.

FIG. 9 shows such a slab transport tire roller 1 which comprises a pipe 4 disposed inside a heating furnace 2 and tires 6 arranged respectively on outer peripheral portions of the pipe 4. The tire roller 1 is rotated by a rotary mechanism (not shown) to transport a cast slab 8 as supported on the tires 6 to rolling equipment through a heating furnace 2 having a high temperature of at least about 1000° C. Accordingly, the tires 6 are made of a material excellent in abrasion resistance and oxidation resistance at high temperatures. The pipe 4 is adapted to pass cooling water therethrough, covered with a heat-insulating material 5 over the portions thereof between the tires and thereby prevented from deflecting or deforming owing to heating.

The tire roller 1 is produced by fitting tires 6 around a pipe 4, fixing the tires to the pipe as by welding, thereafter providing a large number of Y-shaped studs 9 on the outer periphery of the pipe 4, applying a castable or like heat-insulating material 5 to the pipe outer periphery from around the arrangement of studs 9 to such a thickness that the resulting layer is slightly smaller than the tires 6 in outside diameter, and allowing the material 5 to stand for drying.

In fabricating the tire roller of the above construction, the heat-insulating material is not applicable before the Y-shaped studs are attached to the pipe with the tires mounted thereon. Since the heat-insulating material must be dried after the tire roller has been assembled, the roller has the drawback of necessitating a wide space for the drying.

Further because the heat-insulating material is left exposed as it is within the heating furnace, the material is likely to develop cracks due to contact with slabs or slab scale. Such cracks will be further developed as by a centrifugal force during the rotation of the roller, causing the material to separate or fall off. This results in an impaired heat-insulating effect on the pipe, possibly permitting deflection or deformation of the pipe.

It appears possible to protect the heat-insulating material by enclosing the material with a steel plate or the like after the tire roller has been assembled. However, it is impossible to make a tube from the steel plate and fit the tube around the material since the layer of the material formed is given a smaller outside diameter than the tires so as not to contact slabs.

It appears also feasible to wind a steel sheet around the heat-insulating material, whereas it is difficult to fix the steel sheet to the material which is brittle. It is undesirable to fix the steel sheet to the tires as by welding because the sheet is likely to deform when expanded by heating.

An object of the present invention is to provide a slab transport tire roller which is easy to assemble and wherein a heat-insulating material is protected to render the roller reliably operable over a prolonged period of time.

SUMMARY OF THE INVENTION

The present invention provides a slab transport tire roller comprising tires fixed to respective outer peripheral portions of a pipe for passing cooling water therethrough, and a tubular protective sleeve fitting around the pipe between each pair of adjacent tires and having a heat-insulating material accommodated therein. The protective sleeve is engaged with at least one of the adjacent tires and made rotatable with the pipe.

The protective sleeve can be composed of a tubular sleeve member, and a side plate attached to each of open ends of the sleeve member. The side plate is formed with a through hole having a diameter permitting the pipe to extend therethrough with a small clearance formed therein around the pipe.

Preferably, the protective sleeve has engaging means for engaging the sleeve with at least one of the adjacent tires so as to be rotatable with the pipe. The engaging means comprise, for example, an engaging groove formed in the protective sleeve, and an engaging projection provided on the tire. Alternatively, an engaging projection can be provided on the protective sleeve, with an engaging groove formed in the tire.

BRIEF DESCRIPTION OF THE DRAWINGS

FIG. 2A to FIG. 2C are diagrams showing steps of assembling the tire roller of the invention;

DETAILED DESCRIPTION OF THE INVENTION

Figure 1:
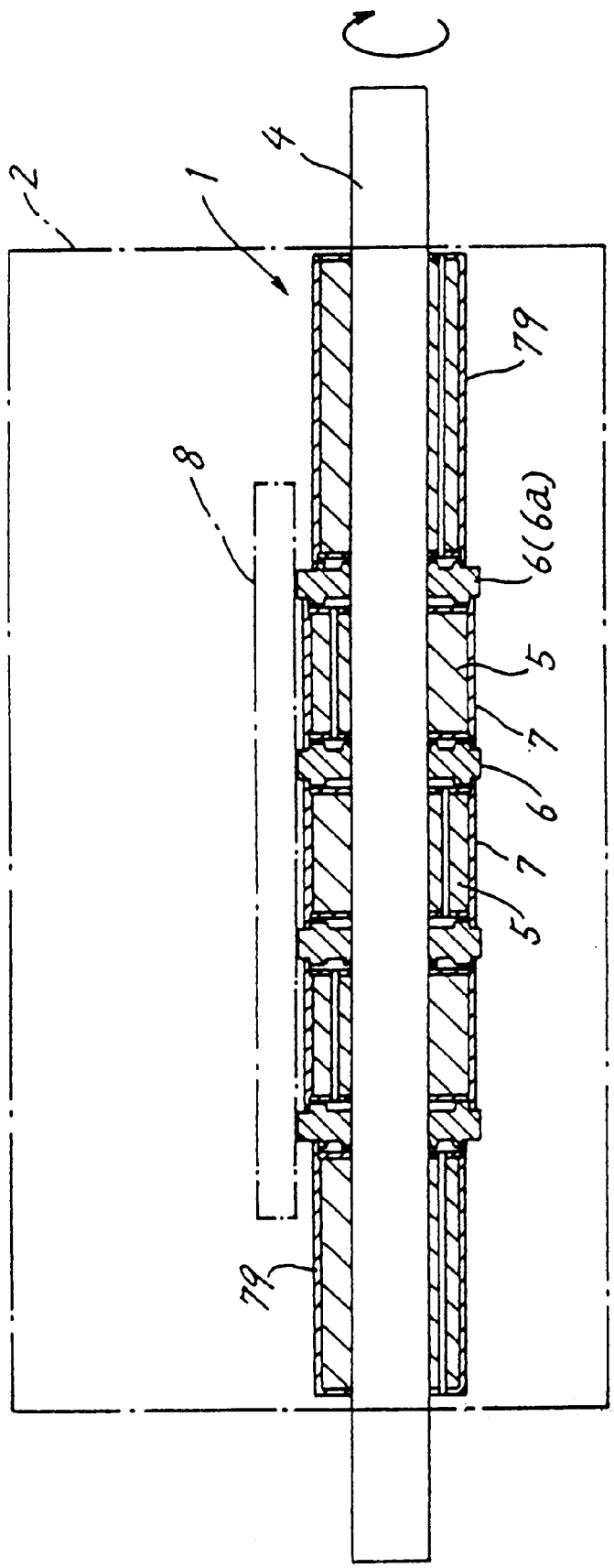
FIG. 1 is a sectional view of a slab transport tire roller of the invention.

The present invention will be described below in greater detail with reference to the drawings.

A sleeve transport tire roller 1 of the invention is prepared by fitting tires 6 and protective sleeves 7 alternately around a pipe 4. After one tire 6 is fitted to the pipe 4, the tire 6 is prevented from rotating idly by being fixed to the pipe 4, for example, by welding as indicated at 65 (FIG. 2A). Next, a protective sleeve 7 is fitted around the pipe 4 (FIG. 2B). The next tire 6a is thereafter fitted to the pipe 4 so as to hold the sleeve 7 between the tires 6, 6a, at least one of the tires 6, 6a is engaged with the protective sleeve 7, and the tire 6a is fixed to the pipe as by welding 65 (FIG. 2C). This procedure is repeated a number of times, whereby the slab transport tire roller 1 is produced.

In the case where the tires 6, 6a are secured to the pipe 4 by welding, it is only one side, in the direction of insertion, of each of the tires 6, 6a that is welded, whereby the tires can be fixed in place with sufficient strength.

The protective sleeve 7 is not fixed directly to the tire 6 but engaged therewith by engaging means 61, 75, so that the protective sleeve 7, which is not secured, is free to thermally expand during use and can be prevented from deforming without allowing stress to act on the tire 6 or the pipe 4. Although it is desirable to engage the protective sleeve 7 with the two adjacent tires, the sleeve 7 is rotatable with the pipe 4 without encountering any problem in performance if engaged with one of the two tires.

Insofar as the tires 6 and the protective sleeves 7 are so arranged as to be eventually positioned alternately, the order in which these components are fitted to the pipe 4 is not limited particularly. For example, the protective sleeve 7 may be fitted first, and the tire 6 is fitted next and fixed. Alternatively, it is possible to fit the tire 6 to the pipe 4, fix the tire 6, then fit the protective sleeves 7 to the pipe at respective opposite sides of the tire, and subsequently fitting and fixing tires 6 to the pipe so as to hold each sleeve 7 between the adjacent tires.

Figure 7:
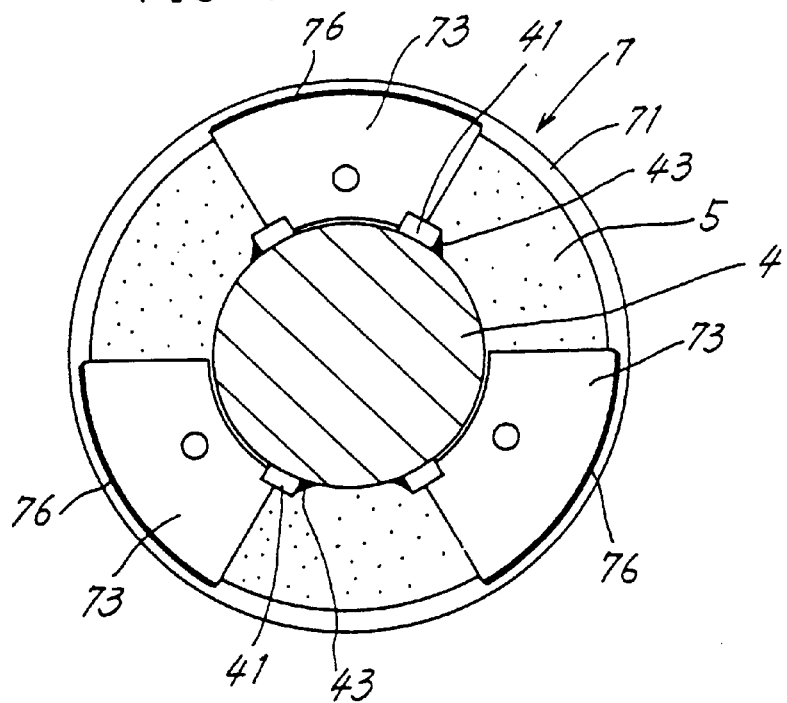
FIG. 7 is a view in section showing engaging portions of a pipe and another protective sleeve.
Figure 8:
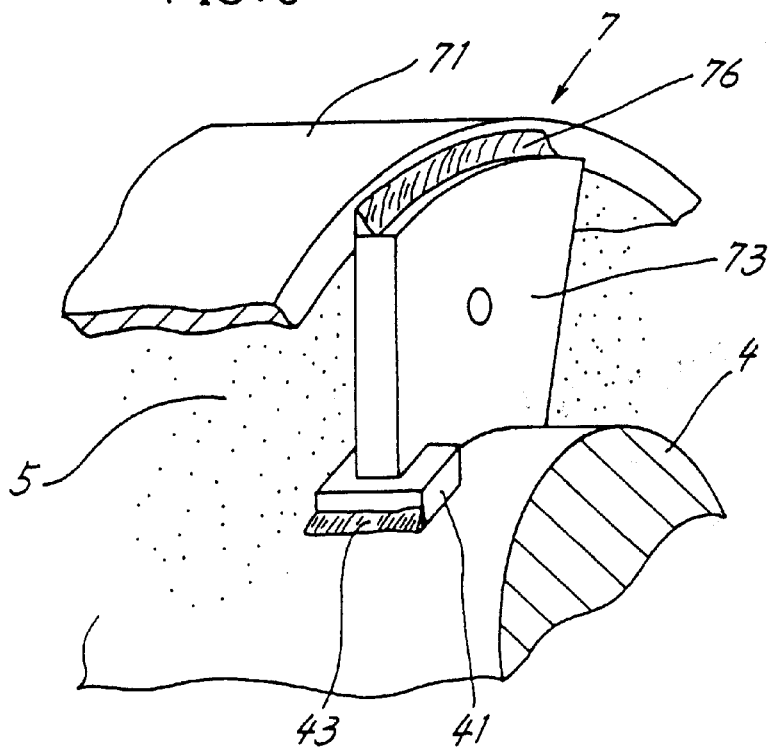
FIG. 8 is a perspective view showing the engaging portions of the pipe and the protective sleeve.
Figure 9:
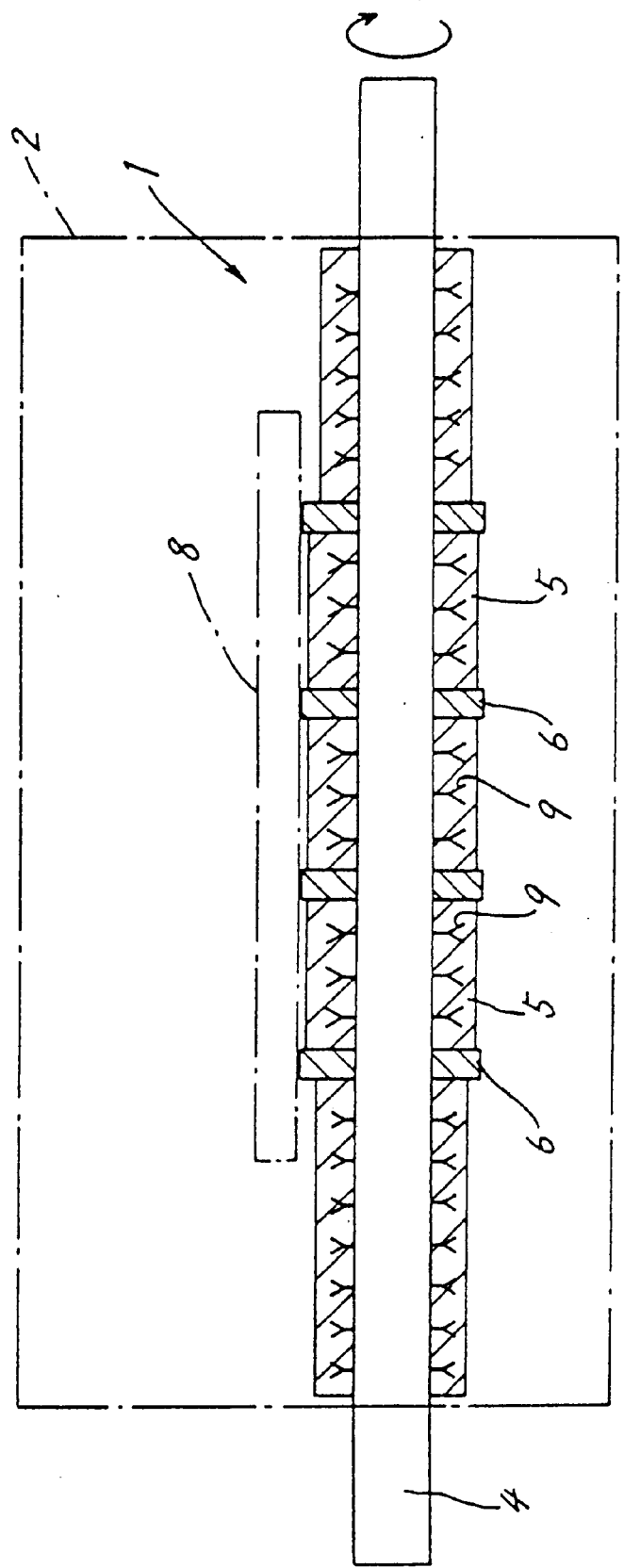
FIG. 9 is a diagram in section of a conventional slab transport tire roller.

The protective sleeve 7 can be engaged with the pipe 4 using engaging means having an engaging groove or the like and thereby made rotatable with the pipe instead of being engaged with the tire 6 (see FIGS. 7 and 8). Since the protective sleeve 7 is not fixed directly to the pipe 4 also in this case, the sleeve 7 is free to thermally expand during use without permitting stress to act on the tire 6 or the pipe 4, and can be free of deformation. If the sleeve 7 is engaged at its one side only with the pipe 4, the other side thereof need not be engaged.

The pipe 4 can be a known one adapted to pass cooling water therethrough and having an end portion connectable to a rotating mechanism (not shown).

Figure 3:
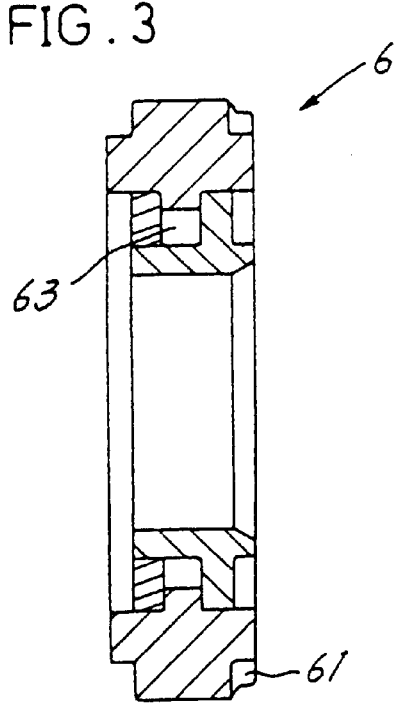
FIG. 3 is a view in section taken along the axis of a tire.

Tires 6 of various constructions are usable which include one integrally cast from a material having high abrasion resistance and excellent oxidation resistance at high temperatures, and an assembly of cast members having a heat-insulating space 63 formed in its interior as seen in FIG. 3. Preferably, the tire 6 is provided with engaging means 61 on one side or both sides thereof for engaging the tire with the protective sleeve 7 to be described below. FIG. 3 shows an engaging projection serving as the engaging means 61.

Figure 4:
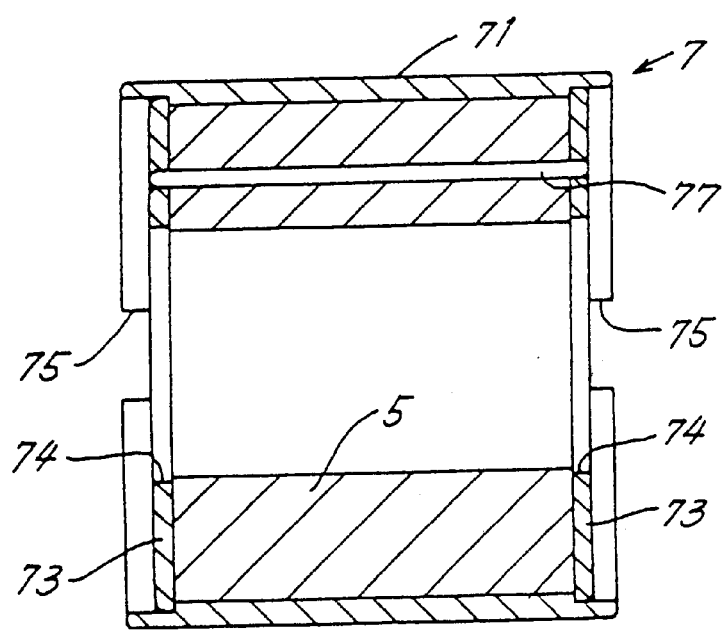
FIG. 4 is a view in section taken along the axis of a protective sleeve.
Figure 5:
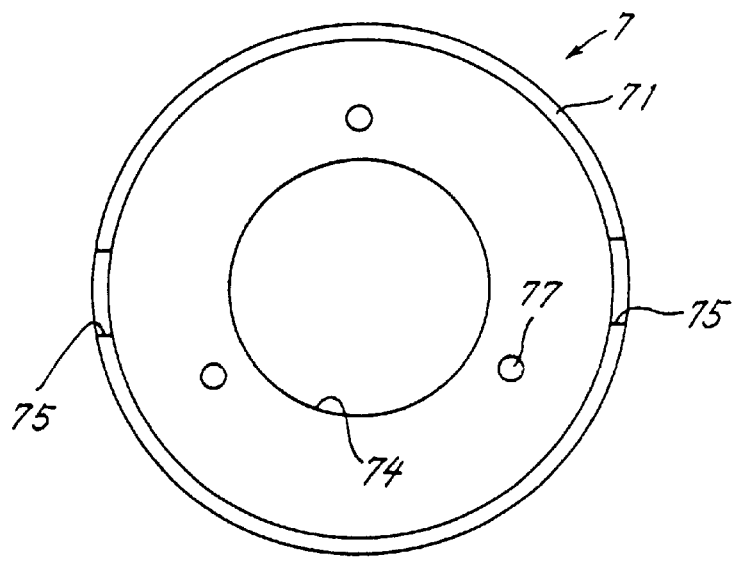
FIG. 5 is a front view of the protective sleeve as it is seen in its axial direction.
Figure 6:
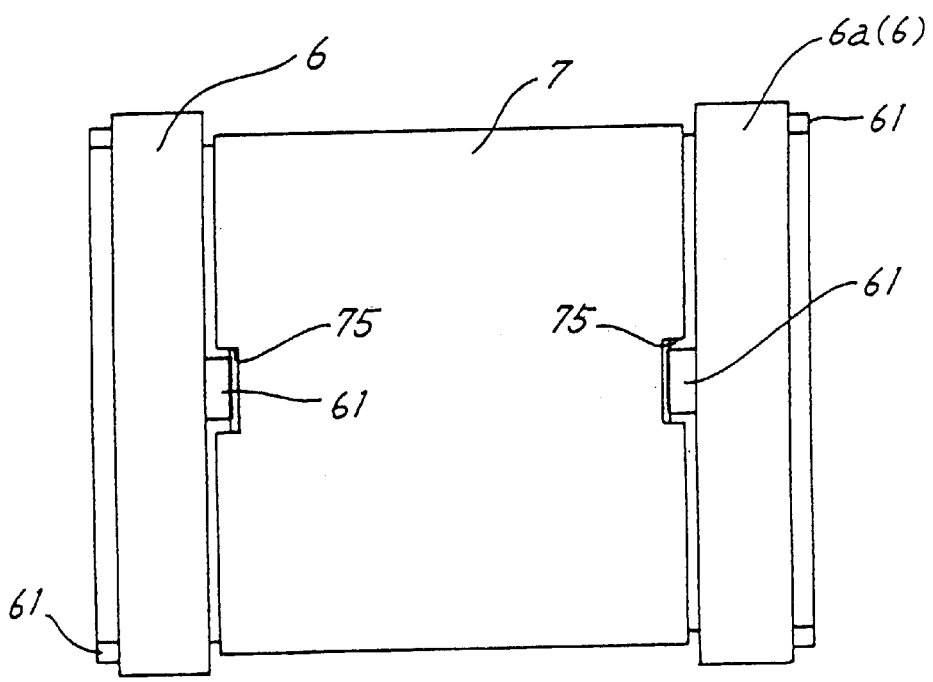
FIG. 6 is a side elevation showing engaging portions of the tire and the protective sleeve.

FIGS. 4 and 5 show a preferred embodiment of protective sleeve 7 which comprises a tubular sleeve member 71, and side plates 73, 73 closing respective open ends of the sleeve member 71. A heat-insulating material 5 is accommodated in the sleeve 7.

Preferably, the tubular sleeve member 71 has a smaller outside diameter than the tire 6 so as to be held out of direct contact with the slab to be transported, while permitting the tire 6 only to contact the slab. The sleeve member 71 or the side plate 73 is formed with engaging means 75 for engagement with the tire 6. As illustrated, the sleeve member 71 is formed at each of its opposite ends with an engaging groove serving as the engaging means 75.

The side plate 73 is in the form of a disk fittable in the sleeve member 71 and is secured to the sleeve member 71 as by welding. The side plate 73 is formed approximately centrally thereof with a through hole 74 for permitting the pipe 4 to extend therethrough with a slight clearance formed therein around the pipe.

The heat-insulating material 5 is placed into the protective sleeve 7 before the sleeve is attached to the pipe 4. Examples of useful heat-insulating materials are $Al_2O_3$ fiber, $SiO_2$ fiber, $ZnO_2$ fiber and a suitable mixture of such fibers.

To reinforce the protective sleeve 7 and to obviate a localized shift of the heat-insulating material 5, the side plates 73, 73 can be interconnected by a rodlike stud 77 when required as seen in FIG. 4.

It is desired that at respective opposite ends of the row of tires 6 and protective sleeves 7 of the slab transport tire roller 1, protective sleeves 79, 79 be arranged which are smaller in outside diameter than the protective sleeves 7 positioned between the tires 6 to avoid contact of the slab 8 with protective sleeves 7 even if the slab bends at its opposite sides.

FIGS. 7 and 8 show another protective sleeve 7 which is mounted in place in a different mode. The protective sleeve 7 is engaged with a pipe 4 using engaging means 41 instead of being engaged with the tire 6. This embodiment is the same as the foregoing embodiment except the engaging mode of the sleeve 7 and will not be described except this feature.

The protective sleeve 7 is formed by arranging sectorial side plates 73 as suitably spaced apart at each end of a sleeve member 71 and welding the plates 73 to the end as at 76, and has a heat-insulating material 5 accommodated therein. The side plate 73 has a free end which is so shaped as to be fittable to the pipe 4 with a slight clearance provided therebetween.

According to the illustrated embodiment, each of the means 41 for engaging the protective sleeve 7 with the pipe 4 comprises a plate piece formed with an engaging groove. After the protective sleeve 7 is fitted to the pipe 4, each engaging means 41 is welded to the pipe 4 as at 43, with the groove portion of the plate piece fitted to the slide plate 73, whereby the sleeve 7 is attached to the pipe. While FIG. 7 shows four engaging means 41, the number of engaging means 41 is not limited specifically insofar as the protective sleeve 7 is thereby engageable with the pipe 4 so as to be rotatable therewith.

The protective sleeve 7 is not secured directly to the pipe 4 but is engaged with the pipe 4 by the engaging means 41 and made rotatable therewith, and is therefore free to thermally expand during use without permitting stress to act on the tire, whereby the deformation of the sleeve 7 can be obviated. If this method of engagement is used for the protective sleeves 79, 79 closer to opposite ends of the roller, the sleeves 79, 79 are engaged with the pipe by engaging means 41, are allowed to thermally expand freely and can be diminished in deformation.

According to the present embodiment, the side plates 73 are attached as suitably spaced apart to the sleeve member 71 in order to obviate the need to form the engaging projection to be engaged in the engaging groove of each engaging means 41 and to reduce the amount of material.

With the slab transport tire roller 1 of the present invention, the heat-insulating material 5 is enclosed with the protective sleeve 7 and is therefore held out of direct exposure within the heating furnace. This eliminates the likelihood of cracks developing owing to the contact of the material 5 with slabs or slab scale, preventing the insulating material 5 from separating or falling off and enabling the material to retain a satisfactory heat-insulating effect on the pipe over a prolonged period of time.

The protective sleeve 7 is fitted around the pipe 4 so as to be engageable with the pipe 4 or with at least one of the tires 6, 6a adjacent to the sleeve 7, is therefore not fixed directly and is consequently free to expand thermally without allowing stress to act on the tires 6, 6a and on the pipe 4.

Furthermore, fibers are usable as the heat-insulating material, so that the slab transport tire roller can be of smaller weight than when the castable is used.

In producing the slab transport tire roller by the method of the invention, the pipe can be furnished with the heat-insulating material 5 merely by placing the material 5 into the protective sleeve 7, fitting the material 5 as accommodated in the sleeve 7 around the pipe 4 and engaging the sleeve with the pipe or tire. This eliminates the need for the conventional steps of attaching Y-shaped studs 9 to the pipe after mounting tires thereon, applying the heat-insulating material 5 and drying the material 5. Accordingly, the members can be assembled into components, which can thereafter be assembled eventually into the roller.

Apparently the present invention can be modified or altered by one skilled in the art without departing from the spirit of the invention. Such modifications or alterations are included within the scope of the invention as set forth in the appended claims.

What is claimed is:

1. A slab transport tire roller comprising:

a pipe for passing cooling water therethrough;

a plurality of tires fixedly arranged directly on an outer periphery of said pipe; and a plurality of tubular protective sleeves having heat-insulating material accommodated therein fitted around the pipe, each of the plurality of protective sleeves being disposed between a pair of the tires, each of the plurality of the protective sleeves being lockingly engaged with at least one of the tires and rotatable with the pipe.

2. The slab transport tire roller as defined in claim 1 wherein at least one of the protective sleeves comprises:

a tubular sleeve member, and side plates attached to respective open ends of the sleeve member, each of the side plates being formed with a through hole having a diameter permitting the pipe to loosely extend therethrough.

3. The slab transport tire roller as defined in claim 2 wherein the sleeve member or the side plate is engaged with at least one of the adjacent tires to render the protective sleeve rotatable with the pipe.

4. A slab transport tire roller comprising:

a pipe for passing cooling water therethrough;

a plurality of tires fixedly arranged directly on an outer periphery of said pipe; and a plurality of tubular protective sleeves having heat-insulating material accommodated therein fitted around the pipe, each of the plurality of protective sleeves being disposed between a pair of the tires, wherein at least one of the protective sleeves comprising a tubular sleeve member and side plates attached to respective open ends of the sleeve member, each of the side plates being formed with a through hole having a diameter permitting the pipe to loosely extend therethrough, and wherein at least one of the side plates being lockingly engaged with the pipe to render the protective sleeve rotatable with the pipe.

5. A method of producing a slab transport tire roller comprising tires fixed respectively to a plurality of portions of an outer periphery of a pipe for passing cooling water therethrough, and a heat-insulating material enclosing the outer periphery of the pipe between the tires, the method comprising the steps of:

fittingly fixing a first tire to the pipe;

fitting around the pipe a tubular protective sleeve having a heat-insulating material accommodated therein;

lockingly engaging the protective sleeve with the first tire;

fitting a second tire around the pipe so as to hold the protective sleeve between the tires; and fixing the second tire to the pipe.

6. A method of producing a slab transport tire roller comprising tires fixed respectively to a plurality of portions of an outer periphery of a pipe for passing cooling water therethrough, and a heat-insulating material enclosing the outer periphery of the pipe between the tires, the method comprising the steps of:

fittingly fixing a first tire to the pipe;

fitting around the pipe a tubular protective sleeve having a heat-insulating material accommodated therein;

fitting a second tire around the pipe so as to hold the protective sleeve between the tires;

lockingly engaging the protective sleeve with the second tire; and fittingly fixing a second tire to the pipe.

7. The slab transport tire roller as defined in claim 2 wherein the side plates are interconnected by a plurality of rodlike studs in order to reinforce the protective sleeve and to obviate a localized shift of the heat-insulating material.

8. The slab transport tire roller as defined in claim 4 wherein the side plates are interconnected by a plurality of rodlike studs in order to reinforce the protective sleeve and to obviate a localized shift of the heat-insulating material.

9. The method as defined in claim 5 wherein after the step of fitting the second tire around the pipe, further including a step of engaging the second tire with the second tire.

10. The slab transport tire roller comprising:

a pipe for passing cooling water therethrough;

a plurality of tires fixedly arranged directly on an outer periphery of said pipe; and a plurality of tubular protective sleeves having heat-insulating material accommodated therein fitted around the pipe, each of the plurality of protective sleeves being disposed between a pair of the tires, wherein at least one of the protective sleeves comprises:
    a tubular sleeve member, and
    side plates attached to respective open ends of the sleeve member, each of the side plates being formed with a through hole having a diameter permitting the pipe to loosely extend therethrough, and wherein the side plates are interconnected by a plurality of rodlike studs in order to reinforce the protective sleeve and to obviate a localized shift of the heat-insulating material.

* * * * *